United States Patent [19]

Hegedus et al.

[11] 4,222,236

[45] Sep. 16, 1980

[54] METHOD FOR REDUCING CO AND HC EMISSIONS

[75] Inventors: Louis Hegedus, Grosse Pointe Woods; Se H. Oh, Troy, both of Mich.; Kenneth Baron, Diamond Bar, Calif.

[73] Assignee: General Motors Corporation, Detroit, Mich.

[21] Appl. No.: 916,953

[22] Filed: Jun. 19, 1978

[51] Int. Cl.³ ............................................... F01N 3/10
[52] U.S. Cl. ........................................ 60/274; 60/284; 123/491; 123/438; 123/435; 123/179 G
[58] Field of Search ................. 60/276, 284, 285, 274; 123/119 F, 179 L, 119 EC, 124 B, 32 EG, 32 EA, 179 G

[56] References Cited

U.S. PATENT DOCUMENTS

| | | | |
|---|---|---|---|
| 3,921,612 | 11/1975 | Aono | 60/276 |
| 3,949,551 | 4/1976 | Eichler | 60/274 |
| 4,024,706 | 5/1977 | Adawi | 60/274 |
| 4,040,408 | 8/1977 | Kraus | 123/179 L |
| 4,046,118 | 9/1977 | Aono | 60/276 |
| 4,095,570 | 6/1978 | Sheffer | 123/119 F |
| 4,143,621 | 3/1979 | Long | 123/32 EG |

*Primary Examiner*—Douglas Hart
*Attorney, Agent, or Firm*—Sidney Carter

[57] ABSTRACT

A method for decreasing CO and HC emissions in a vehicle exhaust stream during the period of engine warm-up following the start of engine operation, in which the A/F mixture to the engine is pulsed by first using a mixture which is leaner than that otherwise used thus reducing the CO and HC content of the exhaust stream exiting the engine to an amount below that of the CO and HC otherwise present and then using an A/F mixture which is richer than such lean mixture and is substantially that otherwise used thus increasing the amount of CO and HC in the vehicle exhaust stream to substantially the amount otherwise present, passing the pulsed exhaust stream through a catalytic converter adapted to oxidize the CO and HC constituents, and repeating this pulsing continuously through the period of engine warm-up and at a rate sufficient to achieve increased catalytic conversion of CO and HC over that obtained without pulsing, the rate being also sufficiently rapid so as to preclude engine-stall. A preferred system for practicing the method involves apparatus for the repeated opening of the choke plate of the engine carburetor during the period when the choke plate is not full-open.

8 Claims, 8 Drawing Figures

STEADY STATE CONVERSION WITH CO PULSING AT VARIOUS TEMPS.

Fig. 1

EFFECTS OF PULSE AMPLITUDE ON CONVERSION ENHANCEMENT

EFFECT OF PULSE DURATION ON CONVERSION ENHANCEMENT

METHOD FOR REDUCING CO AND HC EMISSIONS

This invention relates to a method for operating a vehicle engine in such a manner, and a system for practicing such method, as to significantly decrease the CO and HC emissions during the period of engine warm-up following the start of engine operation. More particularly, we have discovered a method for operating an engine so as to both decrease the amount of CO and HC in the exhaust from the engine and to increase the average conversion of CO and HC during the light-off period of the catalyst.

In accordance with our invention, there is provided a method for reducing CO and HC emissions from an engine during the period of engine operation when the air-fuel, herein also designated as A/F, mixture to the engine is extremely rich and the CO and HC emissions are at their highest levels. Since the 1975 Federal Test Procedure requires the collecting and measuring of the test vehicle emissions from cold engine-start through designated operating cycles and modes over about a 45 minute period, the engine warm-up period is that in which substantial gains can be made. We have found that significant reductions in CO and HC emissions from the engine and improved conversion efficiency of the oxidizing catalyst are achieved by repeated pulsing of the A/F mixture to the engine during the warm-up period after engine start. More particularly, the rich A/F mixture on cold start, normally at a ratio of about 10:1 after cranking, is pulsed by making the mixture more lean than that normally obtained during the warm-up period, e.g., when the choke plate position is under the control of the choke thermostatic bimetal coil spring which relaxes tension as the engine warms up and continuously assumes a more open position in the carburetor barrel, the normally obtained mixture being referred to herein as that otherwise used, thus reducing the CO and HC content of the exhaust stream exiting the engine. This is then followed by the use of an A/F mixture which is richer than the lean mixture and is substantially that otherwise used to thus increase the amount of CO and HC in the exhaust stream to substantially the amount otherwise present. This raising and lowering of the A/F ratio, pulsing, is repeated continuously through the period of engine warm-up at a rate sufficiently rapid so as to prevent engine-stall. Such engine operation is believed to achieve more complete combustion of the fuel to reduce CO and HC emissions, and as shown hereinafter, through the periodic reduction of CO to the catalytic converter, has been found to improve the CO and HC oxidizing efficiency of the catalyst.

While it is known from the scientific literature that multiple steady states may exist in catalytic converter operation, our invention is based on the discovery that pulsing the CO concentration through a noble metal oxidizing catalyst bed, i.e., a porous refractory support impregnated with a catalyst selected from the group consisting of platinum and platinum with palladium, each alone or with rhodium and/or iridium, produces a CO conversion jump from a lower value to a higher value. More particularly, our laboratory experiments and theoretical studies show that changing the inlet CO concentration to a catalytic converter maintained in the lowest steady state by injecting a pulse of reduced CO concentration causes the catalyst to jump to a higher steady state conversion. Our laboratory tests have shown that this reaction of the catalyst can be used to advantage in an automotive emissions control system by lowering the light-off temperature of the catalyst in an automotive emission control system and by increasing the overall conversion efficiency of the catalyst.

The existence of multiple steady states in catalytic reactors is disclosed in the article entitled "Experimental Observation of Multiple Steady-States for Diluted and Blended Catalyst Beds", J. Votruba et al, *Chemical Engineering Science,* 1976, Vol. 31, pp. 971–974. The authors disclose the control of a catalytic reactor by varying the ratio of active catalyst and inert diluting material in order to obtain maximum conversion or selectivity of reaction by creating conditions for the optimum temperature profile for the reaction, specifically by the uneven distribution of the catalyst in the bed. The authors disclose the use of platinum as the highly active catalyst material together with the use of medium active catalysts such as the oxides of copper and manganese and the use of non-catalytic diluent material such as alumina spheres. The reaction studied with the oxidation of CO under various steady state conditions of temperature and CO concentration. Pulsing of the CO concentration was not demonstrated. The article by Root et al entitled "An Experimental Study of Steady State Multiplicity in a Loop Reactor", *AIChE Journal,* 1969, Vol. 15, No. 5, pp. 670–679, discloses studies on the reaction between sodium thiosulfate and hydrogen peroxide in aqueous solution to demonstrate the existence of multiple steady states in ranges of feed flow rates and recycle ratios. The authors also disclose reactor instability by the creation of a new steady state by imposing large disturbances on the reactor by large variations in the flow rate of the reactants. This study is limited to an entirely different reaction system involving the study of effects of variations and reaction parameters entirely different from those covered by our invention. Also of interest from a prior art standpoint is the patent to Adawi et al U.S. Pat. No. 4,020,706 dated May 24, 1977. The patentees disclose a process for widening the window of A/F ratios over which an engine may be operated and still produce an exhaust gas composition which may be treated by use of a three-way catalyst system set to control the A/F ratio in a regular and continuous manner after engine warm-up so as to displace the A/F ratio equal amounts to the rich and to the lean side of stoichiometric and a frequency that insures excess oxygen storage capacity for the catalyst. The disclosed process is entirely different from that of our invention in that, as regards catalytic conversion, we are concerned with only the oxidation reaction of the catalyst during the warm-up period prior to the period of closed loop stoichiometric control of the three-way catalyst system. Also, the patented process increases engine-out CO and HC concentration by periodically going to rich mixtures from the mean of stoichiometric whereas by our invention we reduce such engine-out concentrations by going to a more lean mixture than that for which the engine is normally set.

It is accordingly an object of our invention to provide a method for decreasing CO and HC emissions in vehicle exhaust during the warm-up period after engine-start by repeated pulsing of the air-fuel mixture to the engine from that normally provided for by the tuning of the engine to a mixture leaner than such normal mixture, the rate of pulsing being such as to preclude engine-stall.

It is a further object of our invention to provide for improved conversion levels as to CO and HC emissions by repeated pulsing of the amount of CO in the exhaust stream to the converter from a level normally exiting the engine during warm-up to a lower level of CO.

It is a further object of our invention to provide a method for decreasing CO and HC emissions from a automotive vehicle during the warm-up period of the engine by the continuous pulsing of the air-fuel mixture to the engine during such period by repeatedly lowering the concentration of CO and HC exiting the engine below that otherwise obtained in the absence of such pulsing and passing such pulsed exhaust stream through a catalyst to achieve enhanced oxidation of CO and HC, the rate of pulsing being that effective to raise the conversion performance of the catalyst from one level to a higher level while being sufficiently rapid as to prevent engine-stall.

It is another object of our invention to provide for pulsing of the air-fuel mixture to the engine during warm-up by repeatedly opening the choke plate beyond the setting otherwise obtained under the control of the automatic choke.

It is yet another object of our invention to provide means for pulsing the air-fuel ratio to the engine to enable the practice of the method of our invention.

These and other objects of our invention will be apparent from the description which follows and from the attached drawings in which.

In conducting our laboratory experiments we were able to demonstrate the enhancement of CO conversion in an isothermal, integral catalytic reactor from a low steady state to a higher steady state by means of a single inlet CO concentration pulse. The catalyst used was spherical alumina supported pellets having the properties listed in TABLE I below. The catalyst was aged for 1000 hours in the exhaust gas of a dynamometer-mounted V-8 automobile engine. The pellets were found to be surrounded by a partially impervious poison layer with a reduced diffusivity.

TABLE I

| CATALYST PROPERTIES | |
|---|---|
| Pt (wt.%) | 0.06 (est.) |
| Pt dispersion (%) | 40 (est.) |

TABLE I-continued

| CATALYST PROPERTIES | |
|---|---|
| Pt surface area/pellet ($cm^2/cm^3$) | 2352 (est.) |
| Pb (wt. %) | 1.31 |
| P (wt. %) | 0.39 |
| Pore volume - macro ($cm^3/g$) | 0.070 |
| Pore volume - micro ($cm^3/g$) | 0.515 |
| Pore radius - macro (A)* | 13099 |
| Pore radius - micro (A)* | 220 |
| $Al_2O_3$ BET Surface Area ($m^2/g$) | 57 |
| Pellet solid density ($g/cm^3$) | 3.61 |
| Pellet density ($g/cm^3$) | 1.16 |
| Pellet radius (cm) | 0.1766 |

*Integral Averaged

For the catalyst used, both the noble metal impregnation profile and the poison profile were found to be reasonably sharp along the pellet radius, so that the catalyst pellets can be visualized as a composite material with four different layers, the center zone being unimpregnated with Pt, the outer zone and two inner zones between the center and outer zones being Pt impregnated. The inner zone adjacent the outer zone is poisoned without pore plugging, the outer zone is poisoned and partially plugged, and the inner zone adjacent the center zone is unpoisoned and unplugged. This catalyst was used because it exhibited a wide range of steady state multiplicities. However, multiple steady states were also routinely observed on fresh catalyst pellets.

The integral reactor used in our experiments is cylindrical in shape with a reactive section of 10 $cm^3$ packed with the Pt-alumina catalyst sandwiched between two catalytically inactive SiC layers which serve as a heat transfer medium and also help to provide a fully developed flow pattern through the reactor section, the feedstream consisting of CO, $O_2$ and $N_2$. The stainless steel reactor tube was heated to the desired temperature by an electric furnace, and both the inlet and outlet temperatures of the reactive section were monitored using thermocouples. Also, electrochemical and infrared analyzers were used to measure inlet and outlet $O_2$ and CO concentrations, respectively.

CO concentration pulses were injected to the reactor inlet using four solenoid valves which, when energized, allowed a second, supplemental, CO stream instead of the main CO stream to feed the reactor for a predetermined period of time. The pulse amplitudes were varied by adjusting the concentrations in the main and supplemental CO streams. Pressure changes during the solenoid operation were negligibly small.

In our laboratory experiments the inlet CO concentrations were kept low enough, about 0.3 vol. %, to ensure near-isothermal operation and a large excess of $O_2$, 2 vol. %, was used.

Our laboratory tests were designed to investigate the possibility of enhancing the catalytic reactor conversion by means of deliberate and sudden changes of the initial steady state. For all the results reported here, the reactor was initially set to operate at the lowest conversion steady state, and the reactor inlet CO concentration was temporarily reduced to a lower value, while maintaining the total flow rate, the reactor pressure, and oxygen concentration essentially unchanged. Before each pulse, the reactor was cooled down to a temperature well below the hysteresis loop of FIG. 1 and then slowly heated up to a desired temperature to establish the lowest conversion state. The catalytic converter inlet gas stream concentration, nitrogen being the non-reacting constituent, and other conditions of the experiments are shown in TABLE II.

TABLE II

Figure 1:
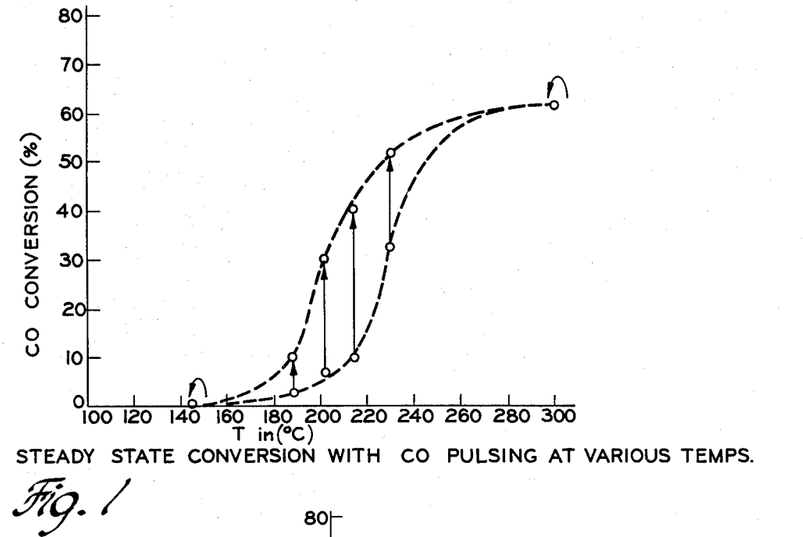
FIG. 1 shows the steady state performance using CO pulsing at various temperatures using a laboratory feedstream consisting of CO, $O_2$ and $N_2$.
Figures 2, 3:
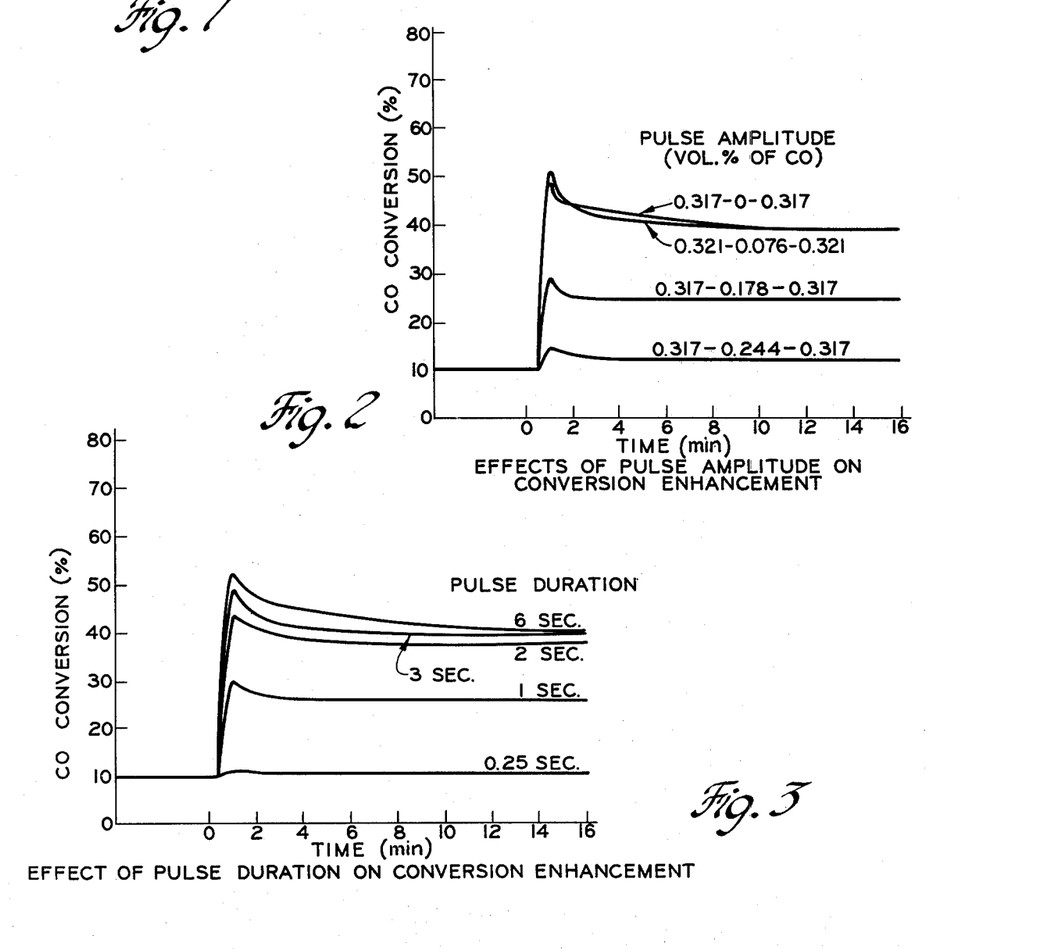
FIG. 2 shows the effect of pulse amplitude on conversion enhancement using the laboratory feedstream.
FIG. 3 shows the effect of pulse duration on conversion enhancement using the laboratory feedstream.

| Description of Various Experimental Conditions | | | |
|---|---|---|---|
| | FIG. 1 | FIG. 2 | FIG. 3 |
| Inlet Temperature (°C.) | varies | 212 | 212 |
| Inlet O$_2$ (Vol. %) | 2.01 | 2.02 | 2.00 |
| Inlet CO (Vol. %) | 0.316-0.108-0.316 | varies | 0.312-0.076-0.321 |
| Pulse Duration (sec) | 3 | 3 | varies |
| Gas Flow Rate (g/sec) | 0.094 | 0.094 | 0.093 |

FIG. 1 shows the steady state conversion data at various temperatures before and after the inlet concentration pulse. In this test, the inlet CO concentration was reduced from 0.316 vol. % to 0.108 vol. % for the duration of 3 sec. It can be readily seen that the steady state conversion is enhanced upon pulsing in the multiple conversion region, while the reactor quickly returns to the original conversion level at temperatures outside the hysteresis loop, e.g., $T_{in}=145°$ C. or $299°$ C. The data of FIG. 1 may be taken to represent the outer boundaries of the hysteresis envelope for the defined test. A pulse of increased CO concentration has no such effect.

Tests were also conducted on the effect of pulse amplitude and duration at a temperature which falls in about the middle of the hysteresis loop in the conversion-temperature plane. FIG. 2 shows the observed time variations of CO conversion for various pulse amplitudes at $T_{in}=212°$ C. In each case of FIG. 2, a pulse of 3 sec duration was injected at time $t=0$ to the reactor which had been previously stabilized at the lowest conversion steady state. The degree of conversion enhancement was found to increase with increasing pulse amplitudes. Also, it appears that the reactor already attained the highest conversion level, about 40%, with the pulse amplitude of 0.321-0.076-0.321, and thus the even larger pulse amplitude of 0.317-0-0.317 did not provide any further conversion enhancement.

FIG. 3 shows the results of varying pulse duration on CO conversion at the same inlet temperature as before, $T_{in}=212°$ C. The pulse amplitude of 0.321-0.076-0.321 was used. Conversion enhancement was observed for the durations of 1 sec or longer, and no further substantial enhancement was achieved when the pulse duration was increased beyond 2 sec.

Based on the test results described it may be theorized the observed enhancement of catalytic oxidation of CO results from the blocking of the active sites to O$_2$ by the presence of the CO molecule, and the coupling of this phenomenon with intrapellet diffusion resistances. This is consistent with the facts that as temperature increases CO is desorbed more rapidly from the active sites with an increase in conversion of CO to CO$_2$, and with the fact that CO is subject to inverse kinetics in this reaction, i.e., conversion to CO$_2$ increases as the concentration of CO decreases. In operating the catalyst with pulsing, each reduction of CO in the feedstream should cause enhancement of catalyst conversion by lifting the catalyst conversion to the higher conversion level as if the temperature had been temporarily raised to desorb CO from active sites as well as by reason of the fact of being subject to the inverse kinetics described.

We have found that the hysteresis response is unique to the oxidation of CO and to the use of a noble metal catalyst resulting from the impregnation and calcining of a porous inert support such as alumina, cordierite and the like, materials well known in the art, by one of the catalytic materials selected from the group consisting of platinum, platinum and palladium, each with or without rhodium and/or iridium. We have also found that the enhancement effect is more pronounced with, but is not limited to, an aged catalyst since the more rapid diffusion obtained with a fresh catalyst tends to move more CO to the active sites with the described increase in site blocking.

Figure 4:
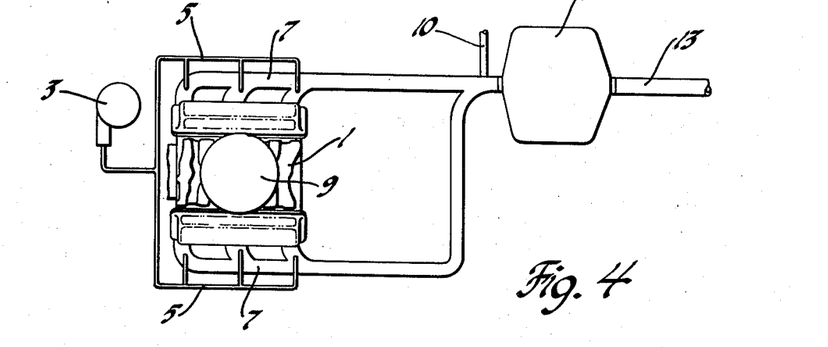
FIG. 4 shows a schematic in plan view of the engine system used in conducting vehicle testing in accordance with the EPA 1975 Federal Test Procedure.
Figure 5:
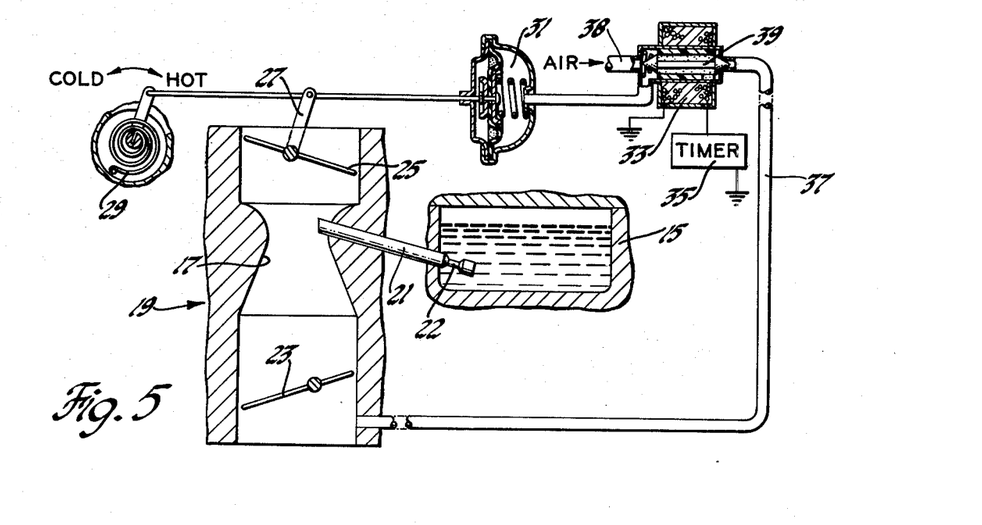
FIG. 5 shows a schematic of the carburetor choke system used to pulse the air-fuel mixture to the engine.

Having reference to FIG. 4, there is shown a schematic of the preferred embodiment of our invention. More particularly, tests were conducted on the system shown using continuous pulsing to obtain repeated reductions in the CO concentration in the exhaust stream to the catalytic converter over the warm-up period. The pulses were applied over the period of the first and first and second cycles of the EPA 1975 Federal Test Procedure, i.e., a period of 125 and 330 seconds. The system shown comprises a 350 cu. in. V-8 1977 engine 1 equipped with an air pump 3 having connections 5 to each of the exhaust manifolds 7. The engine is equipped with the usual theromstatically controlled air filter and carburetor-automatic choke assembly 9 for controlling the normal A/F mixture to the engine. The carburetor however has been modified as shown in FIG. 5 and as described below in order to provide for the pulsing of the A/F mixture to the engine by the repeated opening and return to normal warm-up position of the carburetor choke plate. The exhaust stream from the engine, pulsed during the warm-up period, is conducted to a standard 260 cu. in. converter 11, a sampling tube 10 being provided ahead of the inlet to the converter in order to sample the exhaust stream from the engine for engine-out concentrations of CO and HC. In accordance with the Federal Test Procedure, the exhaust stream from the vehicle is continuously collected from tail pipe 13 and is subjected to continuous analysis for CO and HC. The converter 11 is filled with current commercial platinum-palladium pellet catalyst in the ratio of 5:2 and in the noble metal amounts of 0.036 and 0.014 troy oz., respectively. The catalyst was used prior to the tests by operation in the standard engine system for a distance of 5000 miles. FIG. 5 shows in schematic form the details of the construction used to pulse the A/F mixture to the engine during the warm-up period, such mixture being richer than the mixture after warm-up. The warm-up period for an automotive engine will usually be set for between two and five minutes after engine-start, depending upon the ambient temperature and tuning of the engine. During this warm-up period the automatic choke in the carburetor assembly is set so that the thermostatic coil spring of the automatic choke allows the choke plate to open gradually to the point where it is substantially full-open. This normal relationship as well as the modifications to enable pulsing are shown in FIG. 5 in which a fuel float chamber 15 is connected at the venturi section 17 of the carburetor 19 by means of a fuel feed tube 21 which is calibrated to control the rate of fuel feed by means of an orifice 22. A throttle plate 23 is positioned within the carburetor barrel below the venturi section 17 and is directly connected to the accelerator control for control of engine speed. Choke plate 25 is positioned in the carburetor barrel above the venturi section 17 and is connected through suitable linkage diagrammatically shown as 27 to the thermostatic coil spring 29 of the choke, spring 29 serving to operate against the weight of choke plate 25 and the dynamic force of the air flow through the carburetor barrel to bias the choke plate toward a closed position. As the engine warms up the thermostatic spring 29 tends to relax and lose tension thereby gradually permitting the choke plate 25 to move toward a full-open position, set in this test to about 11 degrees off the vertical.

In order to accomplish the repeated and continuous pulsing of the CO and HC concentration in the exhaust stream from the engine, means have been provided in the preferred embodiment shown in FIG. 5 for repeatedly opening the choke plate 25 against the tension of thermostatic spring 29 through the warm-up period during which the choke plate is held in a position less than full-open. More particularly, a vacuum motor 31 is connected to the choke plate linkage 27 and is interconnected with a source of engine vacuum through an electrical solenoid valve assembly 33 which in turn is electrically connected to an electrical signal generator or timer control 35 which serves to open the vacuum line 37 to operate the vacuum motor 31. On signal from control unit 35 the solenoid stem 39 opens the vacuum line 37 and closes the vent line 38 and is maintained in opened position for the desired period of time thus opening the choke plate 25 to feed an A/F mixture which is more lean than that otherwise obtained during the warm-up period. As noted above, the lean A/F mixture reduces the CO, and HC, concentration in the engine exhaust. Upon de-energizing the solenoid 33 the solenoid stem closes the vacuum line 37 to the motor 31 and opens the vent line 38, the choke plate 25 being quickly released, pulled back by thermostat 29, to its normal position at the particular time during the warm-up period, this position causing the A/F mixture to return to the more rich condition otherwise provided by the normal setting of the choke plate. It is apparent that repeated signalling from the control unit 35 causes the repeated pulsing of the A/F mixture to the engine with repeated decrease in the level of CO in the exhaust from the engine followed by the return of the CO concentration back-up to the level otherwise obtained with the normal setting of the choke plate. It is obvious that vacuum motor 31 and the vacuum and vent lines may be replaced by the direct linkage of the solenoid stem 39 to the choke plate linkage 27. In the roll dynamometer FTP tests described, a lean pulse of two seconds duration was followed by a two second period of normal choke plate setting, pulsing being accomplished therefor at a rate of ¼ cycles per second.

While we have described our preferred system for pulsing the CO level in the exhaust stream exiting the engine as one based on the repeated opening of the choke plate against the tension of the choke thermostatic coil spring, the same results may be obtained by other mechanization based on either the decreasing of the amount of fuel or the increasing of the amount of air making up the A/F mixture to the intake ports or combustion chambers of the engine.

More particularly, this may be accomplished by mechanization within the skill of the art involving pulsing of other elements of the fuel system such as a fuel passage air bleed, fuel bowl level or pressure, or the fuel metering elements including those of a fuel injection system, and the pulsing of air feed controlling components such as an air bypass, or the thermostatic valve in the air filter.

Figure 4A:
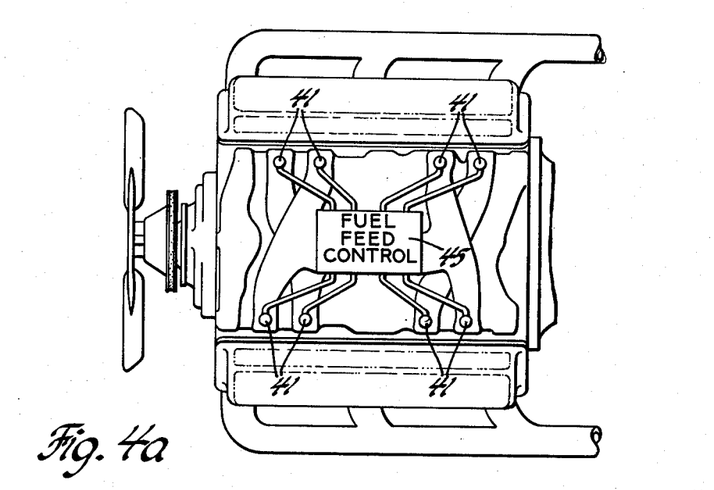
FIG. 4a is similar to FIG. 4 and shows an embodiment of our invention in which the fuel feed is varied in order to achieve the A/F mixture pulsing of our invention.

FIG. 4a shows an engine system similar to that shown in FIG. 4 but modified to illustrate pulsing of the A/F mixture to the engine by varying the amount of fuel instead of air. More particularly, a fuel feed controller 45, either electric, mechanical or hybrid as are all well known in the art, provides the necessary signals to or activation of fuel injectors 41 to pulse the fuel to the combustion chambers by alternately and repeatedly reducing the amount of fuel to the engine below that otherwise used followed by increasing the amount of fuel back up to that otherwise used.

TABLE III

Long** & Short* Period Pulsing - 1975 FTP Data

| Component and Sample Period | Engine-Out (g/mile) | | | Tail Pipe-Out (g/mile) | | | Converter Efficiency (%) | | | Total Reduction (%) | | Engine Reduction (%) | |
|---|---|---|---|---|---|---|---|---|---|---|---|---|---|
| | Base Line | Short Pulse | Long Pulse | Base Line | Short Pulse | Long Pulse | Base Line | Short Pulse | Long Pulse | Short Pulse | Long Pulse | Short Pulse | Long Pulse |
| HC | | | | | | | | | | | | | |
| FTP (41½ min) | 2.24 | 2.37 | 1.95 | 0.62 | 0.50 | 0.42 | 72.32 | 78.90 | 78.46 | 19.35 | 32.26 | — | 12.95 |
| Cycle 1 (0-125 sec) | 11.78 | 9.61 | 7.88 | 12.18 | 10.11 | 8.06 | — | — | — | 17.00 | 33.83 | 18.42 | 33.11 |
| Cycle 2 (125-330 sec) | 1.99 | 2.42 | 1.80 | 0.35 | 0.47 | 0.44 | 82.41 | 80.58 | 75.56 | — | — | — | 9.55 |
| CO | | | | | | | | | | | | | |
| FTP (41½ min) | 22.44 | 18.16 | 14.25 | 13.07 | 6.27 | 5.68 | 41.76 | 65.47 | 60.14 | 52.03 | 56.54 | 19.07 | 36.50 |
| Cycle 1 (0-125 sec) | 327.74 | 168.14 | 148.75 | 310.43 | 149.67 | 141.46 | 5.28 | 10.98 | 4.90 | 51.79 | 54.43 | 48.70 | 54.61 |
| Cycle 2 (125-330 sec) | 17.41 | 28.25 | 18.18 | 1.43 | 6.67 | 3.98 | 91.79 | 76.39 | 78.11 | — | — | — | — |
| NO$_x$ | | | | | | | | | | | | | |
| FTP (41½ min) | 1.34 | 1.39 | 1.40 | 1.48 | 1.41 | 1.50 | — | — | — | 4.73 | — | — | — |
| Cycle 1 (0-125 sec) | 0.38 | 1.05 | 1.18 | 0.41 | 1.10 | 1.17 | — | — | 0.85 | — | — | — | — |
| Cycle 2 (125-330 | 1.27 | 1.12 | 1.30 | 1.22 | 1.02 | 1.25 | 3.94 | 7.87 | 3.85 | 16.39 | — | 11.81 | — |

TABLE III-continued

| | Long** & Short* Period Pulsing - 1975 FTP Data | | | | | | | | | | | |
|---|---|---|---|---|---|---|---|---|---|---|---|---|
| Component and Sample Period | Engine-Out (g/mile) | | | Tail Pipe-Out (g/mile) | | | Converter Efficiency (%) | | | Total Reduction (%) | | Engine Reduction (%) |
| | Base Line | Short Pulse | Long Pulse | Base Line | Short Pulse | Long Pulse | Base Line | Short Pulse | Long Pulse | Short Pulse | Long Pulse | Short Pulse | Long Pulse |
| sec) | | | | | | | | | | | | |

*Short pulse means pulsing from the 20 to the 125 second point.
**Long pulse means pulsing from the 20 to the 330 second point.

The data shown in TABLE III represents the integral averaged values of the data print-outs obtained during the course of running test vehicle system in accordance with the 1975 Federal Test Procedure. The amount of HC, CO and $NO_x$ was measured continuously and the integrated values are shown for the full FTP period and for the first and second cycles, the time periods being as noted. The tests were run for each of the modes of operation noted, specifically (1) Base Line, i.e., operation without pulsing, (2) Short Pulse, i.e., pulsing over the period from the 20 to the 125 second mark, and (3) Long Pulse, i.e., pulsing over the period from the 20 second mark to the 330 second mark.

Figure 6:
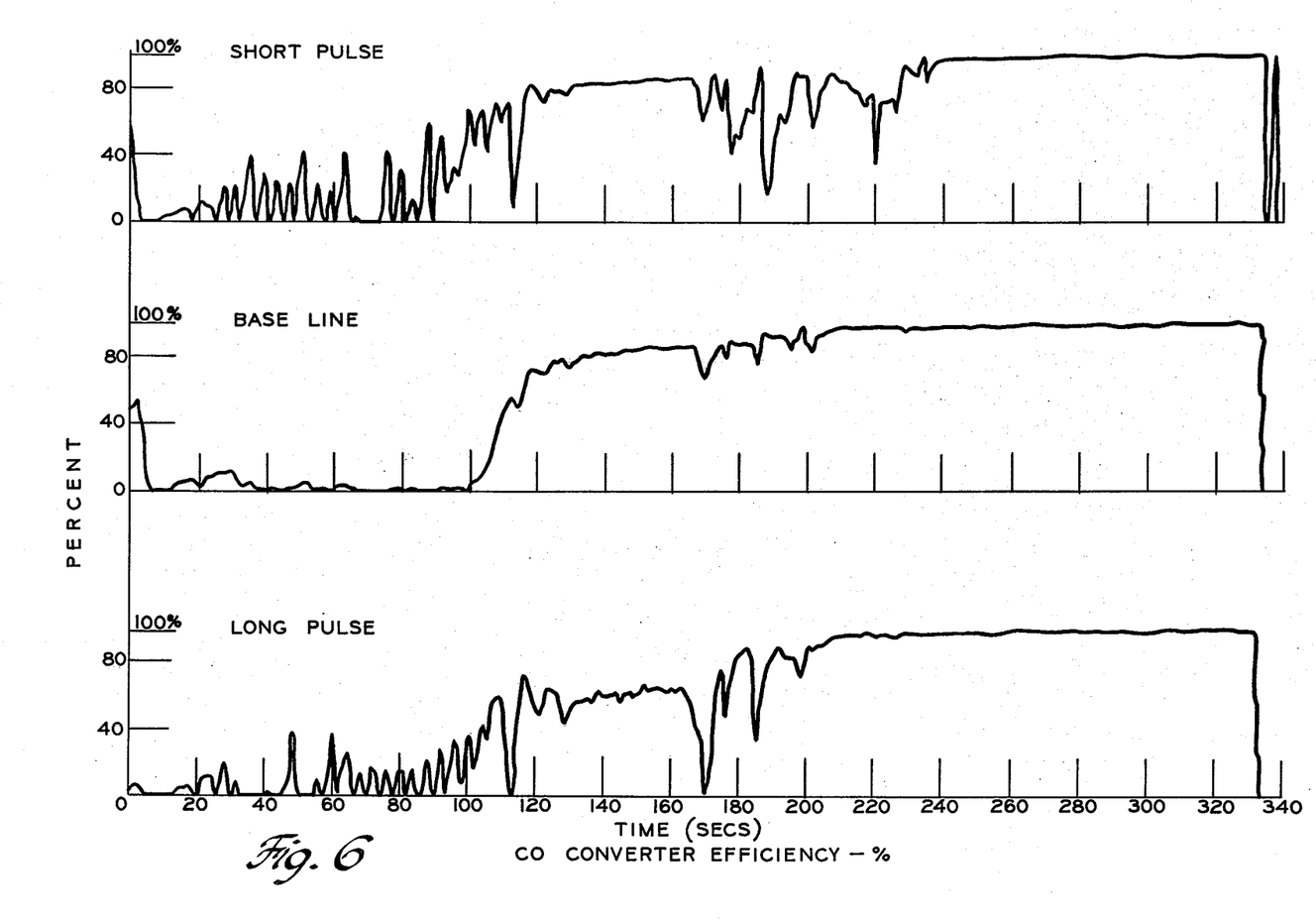
FIG. 6 shows the converter efficiency for CO for the Base Line mode of operation (without pulsing) as compared with that for pulsing during the short period (from the 20 to the 125 second mark) and the long period (from the 20 to 330 second mark).

The greater significance to the data shown in TABLE III is the qualitative fact that pulsing in accordance with our invention substantially reduces CO emissions existing the engine over the full FTP period of 41½ minutes and over the Cycle 1 period of the test, i.e., for the first 125 seconds of engine operation. During Cycle 1 the choke plate is less than at the full open position, in the case of the vehicle under test the full open position was set at about 11 degrees short of the vertical position, and pulsing has an effect on both the combustion in the engine and the activity level of the catalyst. This period of time, about 2 minutes, is substantially that for which the average carburetor is set for release of the choke plate under ambient temperatures of about 70° F., the cold start temperature of the engine under test. The Cycle 2 data shows no significant change since it covers the period from 125 to 330 seconds, this being the period during which the choke plate is full-open and engine-out and catalyst response corresponds to that otherwise existent in the Base Line mode when pulsing was not used. This reduction in CO over the first 125 seconds of operation is clearly shown in the CO emissions print-out of FIG. 6 as regards converter conversion efficiency.

Figure 7:
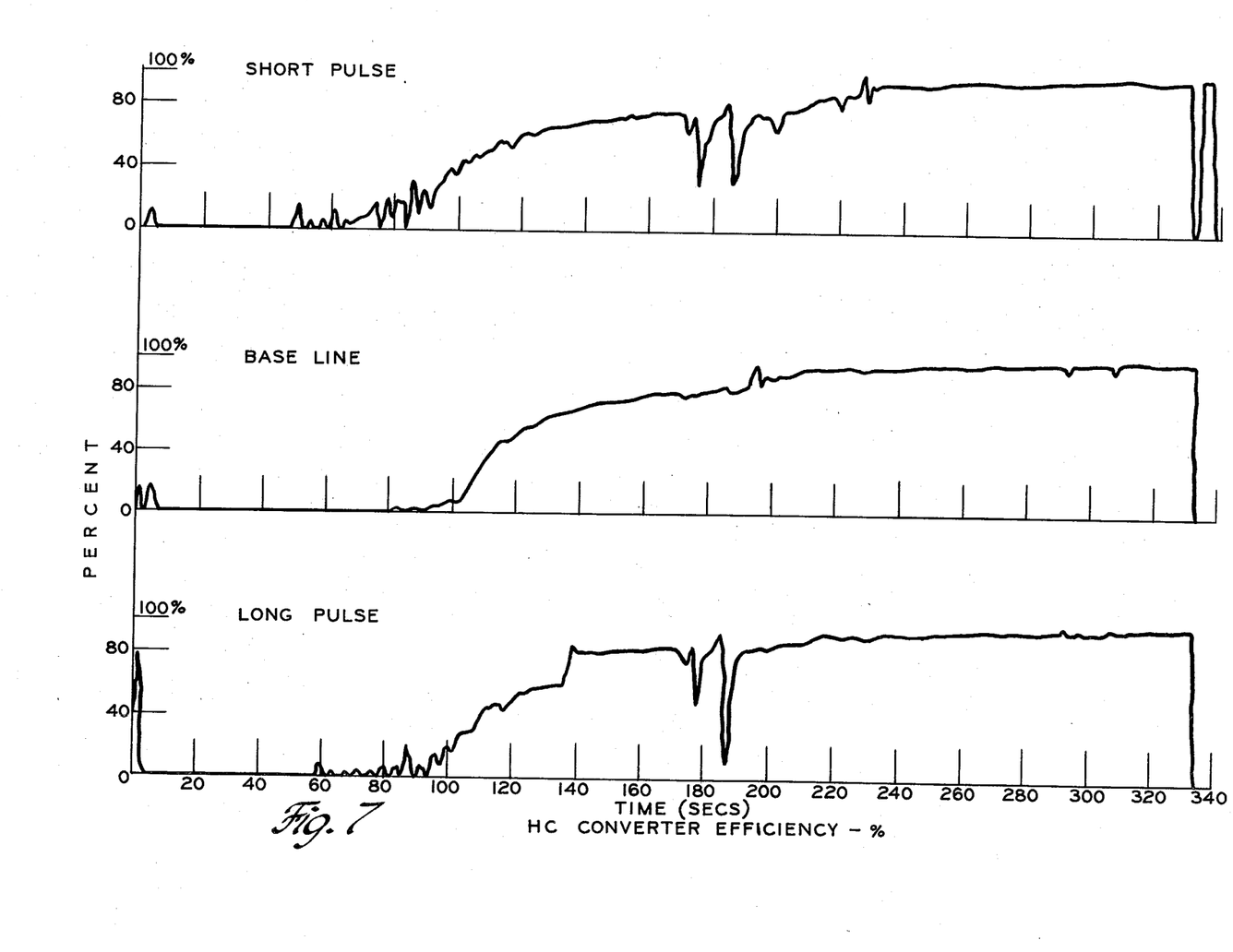
FIG. 7 shows the converter efficiency for HC for the same modes of operation as shown in FIG. 6.

With respect to HC emissions, the data of TABLE III and the print-out of FIG. 7 also demonstrate reductions, though not of the magnitude shown with respect to CO emissions. This, with respect to converter efficiency, is due to the fact that pulsing effects on the catalyst directly affect CO emissions only and only indirectly affect HC emissions. More particularly, CO inhibits the oxidation of HC and thus HC oxidation improves with reduction of the concentration of CO. This effect is clearly shown in the HC print-out of FIG. 7 and in the comparison of the traces of FIG. 7 with those of FIG. 6. The FTP and Cycle 2 data for HC emissions show very little change, such change being considered non-significant, for both engine-out and tail pipe-out measurements. This could be due to the fact that the numbers are so small, relatively, and because of the inherent variances resulting from the fact that the vehicle operator must follow a vehicle speed trace in conducting the tests. The data with respect to $NO_x$ is without significance for reasons noted above. However, as discussed at the outset, our invention applies only to the oxidation reactions and is without effect on the reduction of $NO_x$.

From the foregoing it is readily seen that we have provided a relatively uncomplicated yet effective method and means for accomplishing a large reduction in the CO and HC emissions from an automotive vehicle both by reducing the engine-out emission and by enhancing the conversion performance of the oxidizing noble metal catalyst. It is obvious that our invention is not limited in application to a vehicle. Also, while we have described our invention on the basis of a preferred embodiment using a carburetor with choke plate control to obtain pulsing of the A/F mixture to the engine to obtain periodic and repeated reduction of the CO and HC concentrations in the emissions from the engine, other method and means for achieving such reductions will be apparent to those skilled in the art and such variations are within the intended scope of the claims which follow.

The embodiments of the invention which an exclusive property or privilege is claimed are defined as follows:

1. A method for decreasing CO and HC emissions in a vehicle exhaust stream during the period of engine warm-up following the start of engine operation, comprising the steps of pulsing the A/F mixture to the engine by repeatedly and continuously raising and lowering the A/F ratio by making said mixture more lean than that used in the absence of pulsing thus reducing the CO and HC content of the exhaust stream exiting the engine, each leaning step being followed by enriching the A/F mixture back up to the level used in the absence of pulsing thus increasing the amount of CO and HC in said vehicle exhaust stream, and repeating this pulsing continuously through said period of engine warm-up at a rate sufficiently rapid so as to preclude engine-stall, the use of the intermittent more lean A/F mixture serving to achieve a net more complete combustion of fuel in the engine with reduced CO and HC emissions.

2. A method for decreasing CO and HC emissions in a vehicle exhaust stream during the period of engine warm-up following the start of engine operation, comprising the steps of pulsing the A/F mixture to the engine by repeatedly and continuously raising and lowering the A/F ratio by making said mixture leaner than that used in the absence of pulsing thus reducing the CO and HC content of the exhaust stream exiting the engine to an amount below that of the CO and HC present in the absence of pulsing, each leaning step being followed by enriching the A/F mixture back-up to the level used in the absence of pulsing thus increasing the amount of CO and HC in said vehicle exhaust stream, passing said pulsed exhaust stream through a catalytic converter adapted to oxidize said CO and HC constituents, and repeating this pulsing continuously through said period of engine warm-up and at a rate effective to achieve increased catalytic conversion of CO and HC over that obtained without said pulsing, such rate being also sufficiently rapid so as to preclude engine-stall.

3. A method for decreasing the amount of CO and HC in the vehicle exhaust stream exiting a catalytic converter during the period of engine warm-up following the start of engine operation, the engine having a carburetor equipped with a choke plate and choke thermostatic element, comprising the steps of successively opening and releasing the choke plate to produce a pulsing of the CO and HC concentration in the exhaust to the converter to levels below and substantially back up to that which results from the choke plate position as controlled by the choke thermostatic element, passing said pulsed exhaust stream through said catalytic converter adapted to oxidize CO and HC, said pulsing being applied continuously during said warm-up period when the choke plate is not full open and at a rate effective to achieve increased catalytic conversion of the CO and HC over that achievable without said pulsing and sufficiently rapid to avoid engine-stall.

4. In a method for decreasing the CO and HC in a vehicle exhaust stream during the period of engine warm-up, the steps of repeated pulsing of the CO and HC concentration in the exhaust stream by successively and repeatedly decreasing the amount of CO and HC below that obtained in the absence of pulsing, each instance of decreasing being followed by the step of increasing the amount of CO and HC in said exhaust stream to substantially that obtained in the absence of pulsing, and passing the pulsed exhaust stream through a converter, said exhaust stream to the converter being pulsed during the period of engine warm-up and at a rate such as to achieve increased CO and HC catalytic conversion without engine-stall.

5. A method as set forth in claim 4 wherein pulsing is achieved by alternately increasing the amount of air to the engine above that used in the absence of pulsing followed by decreasing the amount of air to that used in the absence of pulsing.

6. A method as set forth in claim 4 wherein the engine is provided with a carburetor for controlling the A/F mixture, said pulsing being achieved by alternately opening the carburetor choke plate followed by the release of said plate to its normal position during the warm-up period.

7. A method as set forth in claim 4 wherein said pulsing is achieved by alternately reducing the amount of fuel to the engine below that used in the absence of pulsing followed by increasing the amount of fuel back up to that used in the absence of pulsing.

8. In a method as set forth in claim 2, the steps of pulsing the A/F mixture by alternately and repeatedly reducing the amount of fuel below the level supplied during the warm-up period in the absence of fuel pulsing thus reducing the CO and HC content of the exhaust stream exiting the engine, each fuel reduction being followed by the step of increasing the amount of fuel supplied back-up to said level thus increasing the CO and HC content of the exhaust stream exiting the engine, said pulsing being accomplished at a rate effective to produce a periodic and repeated reduction of the CO and HC in the engine exhaust stream.

* * * * *